(12) United States Patent
Bryll

(10) Patent No.: US 9,736,355 B1
(45) Date of Patent: Aug. 15, 2017

(54) PHASE DIFFERENCE CALIBRATION IN A VARIABLE FOCAL LENGTH LENS SYSTEM

(71) Applicant: Mitutoyo Corporation, Kanagawa-ken (JP)

(72) Inventor: Robert Kamil Bryll, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 15/145,682

(22) Filed: May 3, 2016

(51) Int. Cl.
| | |
|---|---|
| G01B 11/24 | (2006.01) |
| H04N 5/232 | (2006.01) |
| G02B 7/04 | (2006.01) |
| G02F 1/29 | (2006.01) |

(52) U.S. Cl.
CPC ........... *H04N 5/23212* (2013.01); *G02B 7/04* (2013.01); *G02F 2001/294* (2013.01)

(58) Field of Classification Search
CPC ............ H04N 5/23212; H04N 5/23264; G02F 2001/294; G02B 7/04
See application file for complete search history.

(56) References Cited

U.S. PATENT DOCUMENTS

| | | | |
|---|---|---|---|
| 6,542,180 B1 | 4/2003 | Wasserman et al. | |
| 7,324,682 B2 | 1/2008 | Wasserman | |
| 7,454,053 B2 | 11/2008 | Bryll et al. | |
| 8,111,905 B2 | 2/2012 | Campbell | |
| 8,111,938 B2 | 2/2012 | Bryll et al. | |
| 8,917,346 B2 * | 12/2014 | Geisler et al. | H04N 5/23212 348/345 |
| 9,060,117 B2 | 6/2015 | Bryll et al. | |
| 2006/0093205 A1 * | 5/2006 | Bryll et al. | G06T 7/0004 382/152 |
| 2010/0040355 A1 * | 2/2010 | Craen et al. | G03B 13/32 396/90 |

(Continued)

OTHER PUBLICATIONS

Bryll, "Multi-Level Image Focus Using a Tubable Lens in a Machine Vision Inspection," U.S. Appl. No. 14/841,051, filed Aug. 31, 2015, 64 pages.

(Continued)

*Primary Examiner* — Michael A Lyons
*Assistant Examiner* — Maurice Smith
(74) *Attorney, Agent, or Firm* — Seed IP Law Group LLP

(57) ABSTRACT

A variable focal length (VFL) lens system is utilized to determine surface Z-height measurements of imaged surfaces. A controller of the system is configured to control a VFL lens (e.g., a tunable acoustic gradient index of refraction lens) to periodically modulate its optical power and thereby periodically modulate a focus position at a first operating frequency, wherein the periodically modulated VFL lens optical power defines a first periodic modulation phase. A phase timing signal is synchronized with a periodic signal in the controller that has the first operating frequency and that has a second periodic modulation phase that has a phase offset relative to the first periodic modulation phase. A phase offset compensating portion is configured to perform a phase offset compensating process that provides Z-height measurements, wherein at least one of Z-height errors or Z-height variations that are related to a phase offset contribution are at least partially eliminated.

20 Claims, 7 Drawing Sheets

(56) References Cited

U.S. PATENT DOCUMENTS

| | | | |
|---|---|---|---|
| 2010/0177376 A1* | 7/2010 | Arnold et al. | G02B 3/0087 359/307 |
| 2014/0368726 A1 | 12/2014 | Gladnick | |
| 2015/0092098 A1* | 4/2015 | Konishi | H04N 5/2352 348/333.11 |
| 2015/0145980 A1 | 5/2015 | Bryll | |

OTHER PUBLICATIONS

Bryll et al., "Chromatic Aberration Correction in Imaging System Including Variable Focal Length Lens," U.S. Appl. No. 14/854,624, filed Sep. 15, 2015, 55 pages.

Cossairt et al., "Diffusion Coded Photography for Extended Depth of Field," *ACM Trans. On Graphics*, 10 pages, 2010.

Duocastella et al., "Simultaneous imaging of multiple focal planes for three-dimensional microscopy using ultra-high-speed adaptive optics," *Journal of Biomedical Optics* 17(5):050505-1-3, 2012.

Gladnick, "Adaptable Operating Frequency of a Variable Focal Length Lens in an Adjustable Magnification Optical System," U.S. Appl. No. 14/795,409, filed Jul. 9, 2015, 58 pages.

Mermillod-Blondin et al., "High-speed varifocal imaging with a tunable acoustic gradient index of refraction lens," *Optics Letters* 33(18):2146-2148, 2008.

Mitutoyo Corporation & Micro Encoder Inc., "QVPAK 3D CNC Vision Measuring Machine Operation Guide," Version 2.0, 86 pages, 1996.

Mitutoyo Corporation & Micro Encoder Inc., "QVPAK 3D CNC Vision Measuring Machine User's Guide," Version 7, 329 pages, 2003.

Nagahara et al., "Flexible Depth of Field Photography," 14 pages, 2008.

Olivier et al., "Two-photon microscopy with simultaneous standard and extended depth of field using a tunable acoustic gradient-index lens," *Optics Letters* 34(11):1684-1686, 2009.

\* cited by examiner

PHASE DIFFERENCE CALIBRATION IN A VARIABLE FOCAL LENGTH LENS SYSTEM

BACKGROUND

Technical Field

This disclosure relates to precision metrology, and more particularly to machine vision inspection systems and other optical systems in which a variable focal length lens may be utilized to periodically modulate a focus position.

Description of the Related Art

Precision machine vision inspection systems (or "vision systems" for short) may be used for precise measurements of objects and to inspect other object characteristics. Such systems may include a computer, camera, optical system, and a stage that moves to allow workpiece traversal. One exemplary system, characterized as a general-purpose "off-line" precision vision system, is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated by reference in its entirety. This type of system uses a microscope-type optical system and moves the stage to provide inspection images of small or large workpieces at various magnifications.

In various applications, it is desirable to perform high speed measurements for high throughput in either stationary or non-stop moving inspection systems. With respect to Z-height measurements, conventional machine vision inspection systems may utilize various types of operations (e.g., points-from-focus operations, etc.) which require movement of the camera through a range of Z-height positions. In confocal systems, movement may similarly be required through a range of Z-height positions (e.g., to determine a position that results in maximum confocal brightness, etc.). In such systems, the speed at which the Z-height measurements can be performed may be limited by the motion of one or more physical components of the systems through the range of Z-height positions. There is a need for improved Z-height measurement processes which can be rapidly performed and which do not compromise dimensional accuracy.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A variable focal length (VFL) lens system is utilized to determine surface Z-height measurements of imaged surface regions. In various implementations, the VFL lens system may include an imaging system, a controller, a focus determining portion and a phase offset compensating portion. In various implementations, the imaging system may include a VFL lens (e.g., a tunable acoustic gradient index of refraction lens, etc.). In various implementations, the controller may be configured to control the VFL lens, provide a phase timing signal, and provide a first Z-height versus phase characterization. The controller may control the VFL lens to periodically modulate its optical power and thereby periodically modulate a focus position of the imaging system over a plurality of focus positions along a Z-height direction at a first operating frequency, wherein the periodically modulated VFL lens optical power may define a first periodic modulation phase. The phase timing signal may be synchronized with a periodic signal in the controller that has the first operating frequency and that has a second periodic modulation phase that has a phase offset relative to the first periodic modulation phase. The first Z-height versus phase characterization may relate respective Z-heights to respective phase timing signal values.

The focus determining portion may include an optical detector and a focus signal processing portion. The optical detector (e.g., a camera, a confocal brightness detector, etc.) may be configured to input light from the imaging system. The focus signal processing portion may be configured to determine raw phase timing signal values corresponding to when signal data from the optical detector indicates that an imaged surface region is at a focus position. The raw phase timing signal values may include a phase offset contribution as related to the phase offset between the first and second periodic modulation phases. The phase offset compensating portion may be configured to input raw phase timing signal values corresponding to imaged surface regions and perform a phase offset compensating process that provides Z-height measurements of the imaged surface regions, wherein at least one of Z-height errors or Z-height variations that are related to the phase offset contribution are at least partially eliminated.

DETAILED DESCRIPTION

Figure 1:
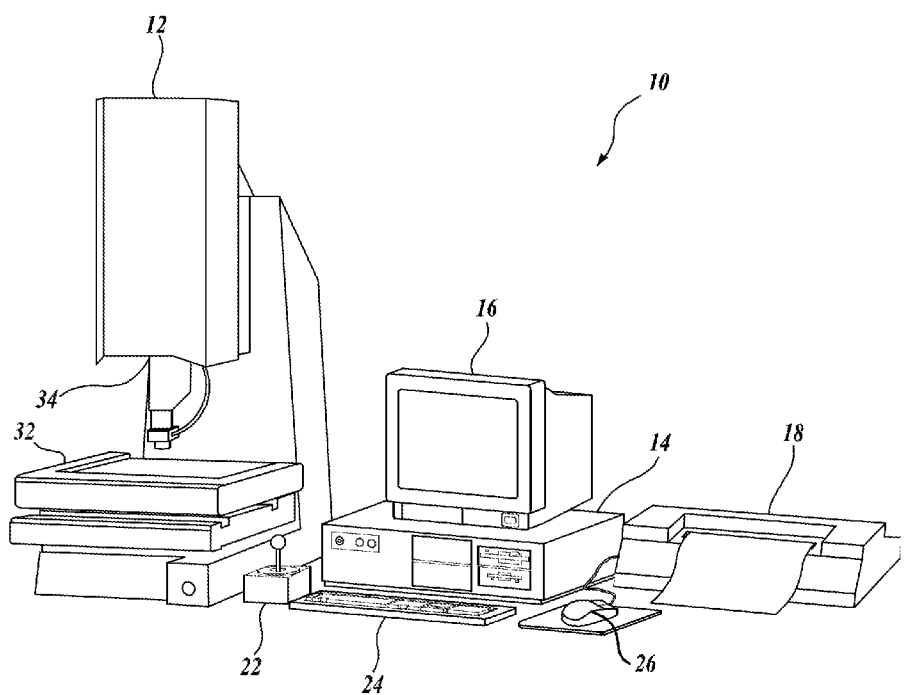
FIG. 1 is a diagram showing various typical components of a general-purpose precision machine vision inspection system.

FIG. 1 is a block diagram of one exemplary machine vision inspection system 10 usable in accordance with principles disclosed herein. The machine vision inspection system 10 includes a vision measuring machine 12 that is operably connected to exchange data and control signals with a controlling computer system 14, and with a monitor or display 16, a printer 18, a joystick 22, a keyboard 24, and a mouse 26. The monitor or display 16 may display a user interface suitable for controlling and/or programming the machine vision inspection system 10. In various implementations, a touchscreen tablet or the like may be substituted for and/or redundantly provide the functions of any or all of the computer system 14, the display 16, the joystick 22, the keyboard 24, and the mouse 26.

More generally, the controlling computer system 14 may comprise or consist of any computing system or device, and/or distributed computing environment, and the like, any of which may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications (e.g., 0.5× to 100×) for the images provided by the optical imaging system 34. Similar machine vision inspection systems are described in commonly assigned U.S. Pat. Nos. 7,324,682; 7,454,053; 8,111,905; and 8,111,938, each of which is hereby incorporated herein by reference in its entirety.

Figure 2:
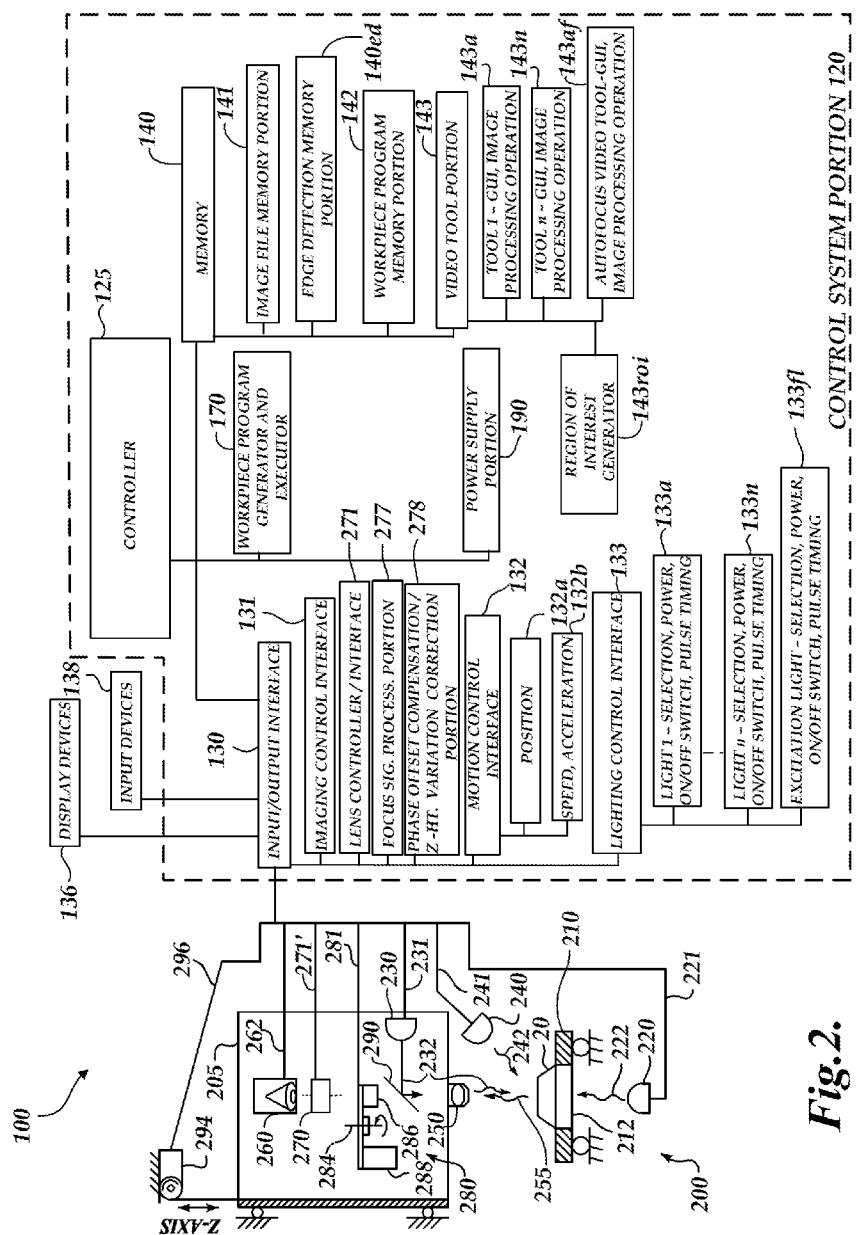
FIG. 2 is a block diagram of a control system portion and a vision components portion of a machine vision inspection system similar to that of FIG. 1 and including features disclosed herein.

FIG. 2 is a block diagram of a control system portion 120 and a vision components portion 200 of a machine vision inspection system 100 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, and 240, and a workpiece stage 210 that may have a central transparent portion 212. The workpiece stage 210 is controllably movable along x- and y-axes that lie in a plane that is generally parallel to the surface of the stage where a workpiece 20 may be positioned.

The optical assembly portion 205 may include an optical detector 260 (e.g., a camera, a confocal optical detector, etc.), a variable focal length (VFL) lens 270, and may also include an interchangeable objective lens 250 and a turret lens assembly 280 having lenses 286 and 288. Alternatively to the turret lens assembly, a fixed or manually interchangeable magnification-altering lens, or a zoom lens configuration, or the like, may be included. In various implementations, the various lenses may be included as part of a variable magnification lens portion of the optical assembly portion 205. In various implementations, the interchangeable objective lens 250 may be selected from a set of fixed magnification objective lenses (e.g., a set ranging from 0.5× to 100×, etc.).

In various implementations, the optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296. As will be described in more detail below, the VFL lens 270 may also be operated to periodically modulate a focus position. A workpiece 20, or a tray or fixture holding a plurality of workpieces 20, which is to be imaged using the machine vision inspection system 100, is placed on the workpiece stage 210. In various implementations, the workpiece stage 210 may be controllable to move (e.g., in the x- and y-axes directions) relative to the optical assembly portion 205, such that the imaged area (e.g., as imaged through the interchangeable objective lens 250, etc.) moves between locations on a workpiece 20, and/or among a plurality of workpieces 20.

One or more of a stage light 220, a coaxial light 230, and a surface light 240 (e.g., a ring light) may emit source light 222, 232, and/or 242, respectively, to illuminate the workpiece or workpieces 20. The coaxial light 230 may emit light 232 along a path including a mirror 290. The source light is reflected or transmitted as workpiece light 255, and the workpiece light (e.g., as used for imaging) passes through the interchangeable objective lens 250, the turret lens assembly 280 and the VFL lens 270, and is gathered by the optical detector 260 (e.g., a camera, a confocal optical detector, etc.). In various implementations, the optical detector 260 inputs the workpiece light and outputs signal data (e.g., one or more images of the workpiece(s) 20, a confocal brightness signal, etc.) on a signal line 262 to the control system portion 120. The light sources 220, 230, and 240 may be connected to the control system portion 120 through signal lines or busses 221, 231, and 241, respectively. The control system portion 120 may rotate the turret lens assembly 280 along axis 284 to select a turret lens through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, and a lighting control interface 133. The motion control interface 132 may include a position control element 132a, and a speed/acceleration control element 132b, although such elements may be merged and/or indistinguishable. The lighting control interface 133 may include lighting control elements 133a, 133n, and 133fl that control, for example, the selection, power, on/off switch, and strobe pulse timing, if applicable, for the various corresponding light sources of the machine vision inspection system 100.

In accordance with the principles disclosed herein, the input/output interface 130 may further include a lens controller/interface 271, a focus signal processing portion 277 and a phase offset compensation/Z-height variation correction portion 278, as will be described in more detail below with respect to FIGS. 3-7. Briefly, in one implementation, the lens controller/interface 271 may include a lens controller including a lens focus operating circuit and/or routine, or the like. The lens controller/interface 271 may be configured or controlled by a user and/or an operating program, and may utilize the signal line 271' to control the VFL lens 270 to periodically modulate its optical power (e.g., sinusoidally) and thereby periodically modulate a focus position of the imaging system over a plurality of focus positions along a Z-height direction at a determined operating frequency. In various implementations, the focus signal processing portion 277 may be configured to determine raw phase timing signal values corresponding to when signal data from the optical detector 260 (e.g., a camera system, a confocal optical detector, etc.) indicates that an imaged surface region (e.g., of the workpiece 20) is at a focus position. As will be described in more detail below, the phase offset compensating portion 278 may be configured to input raw phase timing signal values corresponding to imaged surface regions and perform a phase offset compensating process that provides Z-height measurements of the imaged surface regions, wherein at least one of Z-height errors or Z-height variations that are related to a phase offset contribution are at least partially eliminated.

In various implementations, the imaging control interface 131 and/or lens controller/interface 271 may further include an extended depth of field mode, as described in more detail in copending and commonly assigned U.S. Patent Publication No. 2015/0145980, which is hereby incorporated herein by reference in its entirety. An extended depth of field mode may be selected by a user to provide at least one image (e.g., a composite image) of a workpiece with a depth of field that is greater than what may be provided by the vision components portion 200 when focused at a single focus position. In various implementations, the imaging control interface 131 and/or lens controller/interface 271 may also further include a magnification change adjustment mode, which may be selected or automatically implemented when a magnification change is made or detected, as described in more detail in copending and commonly assigned U.S. patent application Ser. No. 14/795,409, entitled "Adaptable Operating Frequency of a Variable Focal Length Lens in an Adjustable Magnification Optical System", filed on Jul. 9, 2015, which is hereby incorporated herein by reference in its entirety. Other systems and methods including VFL lenses are described in copending and commonly assigned U.S. patent application Ser. No. 14/841,051, entitled "Multi-Level Image Focus Using a Tunable Lens in a Machine Vision Inspection System", filed on Aug. 31, 2015, and in copending and commonly assigned U.S. patent application Ser. No. 14/854,624, entitled "Chromatic Aberration Correction in Imaging System Including Variable Focal Length Lens", filed on Sep. 15, 2015, each of which is hereby incorporated herein by reference in its entirety.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. The video tool portion also includes an autofocus video tool 143af that determines the GUI, image-processing operation, etc., for focus height measurement operations. The autofocus video tool 143af may additionally include a high-speed focus height tool that may be utilized to measure focus heights with high speed, as described in more detail in copending and commonly assigned U.S. Patent Publication No. 2014/0368726, which is hereby incorporated herein by reference in its entirety. In various implementations, the phase offset compensation/Z-height variation correction portion 278 and other related elements may be utilized in conjunction with, or otherwise included in, one or more of the video tools (e.g., the autofocus video tool 143af, a separate video tool, etc.).

In the context of this disclosure, and as is known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool, with the underlying operations being included implicitly.

The signal lines or busses 221, 231, and 241 of the stage light 220, the coaxial light 230, and the surface light 240, respectively, are all connected to the input/output interface 130. The signal line 262 from the optical detector 260, the signal line 271' from the VFL lens 270, and the signal line 296 from the controllable motor 294 are connected to the input/output interface 130. In addition to carrying image data, the signal line 262 may carry a signal from the controller 125 that initiates certain processes (e.g., image acquisition, confocal brightness measurement, etc.).

One or more display devices 136 (e.g., the display 16 of FIG. 1) and one or more input devices 138 (e.g., the joystick 22, keyboard 24, and mouse 26 of FIG. 1) may also be connected to the input/output interface 130. The display devices 136 and input devices 138 may be used to display a user interface that may include various graphical user interface (GUI) features that are usable to perform inspection operations, and/or to create and/or modify part programs, to view the images captured by the optical detector 260, and/or to directly control the vision system components portion 200. The display devices 136 may display user interface features (e.g., as associated with the lens controller/interface 271, the focus signal processing portion 277, the phase offset compensation/Z-height variation correction portion 278, etc.).

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one or more of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a current workpiece (e.g., a run mode workpiece), or workpieces, which is similar to the representative workpiece used when creating the part program.

Figure 3:
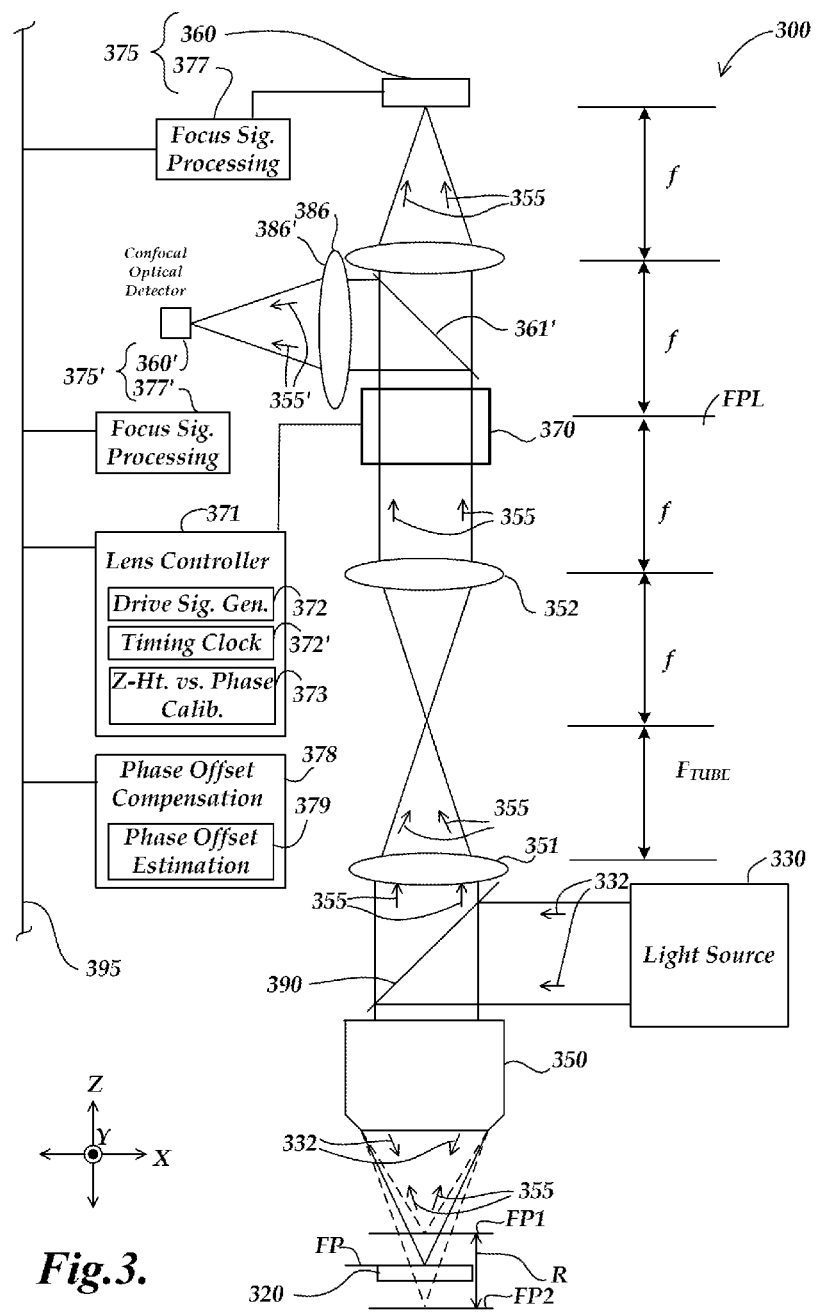
FIG. 3 is a schematic diagram of a variable focal length lens system that may be operated according to principles disclosed herein.

FIG. 3 is a schematic diagram of a VFL lens system 300 that may be adapted to a machine vision inspection system and operated according to the principles disclosed herein. It will be appreciated that certain numbered components 3XX of FIG. 3 may correspond to and/or have similar operations as similarly numbered components 2XX of FIG. 2, except as otherwise described below. As shown in FIG. 3, the VFL lens system 300 includes a light source 330, an objective lens 350, a tube lens 351, a relay lens 352, a VFL lens 370, a relay lens 386, a lens controller 371, a focus determining portion 375 and a phase offset compensating portion 378. In various implementations, each of the lens controller 371, focus determining portion 375 and/or phase offset compensating portion 378, as well as additional components, may be interconnected by one or more data/control busses (e.g., a system signal and control bus 395) and/or application programming interfaces, or by direct connections between the various elements.

In various implementations, the light source 330 is configurable to illuminate a workpiece 320 (e.g., with strobed or continuous-wave illumination) in a field of view of the VFL lens system 300. In various implementations, the light source 330 may include first, second, third, etc., sources of illumination as part of an illumination system. For example, the light source 330 may be operated to provide an instance of strobed illumination by operating a corresponding source of illumination (e.g., a source of illumination that is part of the light source 330). In various implementations, in order to achieve proper lighting balance, the light source 330 may be controllable so as to allow for independent adjustment of the intensity of all instances of strobed illumination (e.g., each corresponding to a different source of illumination within the light source 330) as well as simultaneous adjustment to control an overall brightness of an image.

In operation, in the implementation shown in FIG. 3, the light source 330 is a "coaxial" light source configured to emit source light 332 along a path including a partial mirror 390 and through the objective lens 350 to a surface of a workpiece 320, wherein the objective lens 350 receives workpiece light 355 that is focused at a focus position FP proximate to the workpiece 320, and outputs the workpiece light 355 to the tube lens 351. In other implementations, analogous light sources may illuminate the field of view in a non-coaxial manner, for example a ring light source may illuminate the field of view. In various implementations, the objective lens 350 may be an interchangeable objective lens and the tube lens 351 may be included as part of a turret lens assembly (e.g., similar to the interchangeable objective lens 250 and the turret lens assembly 280 of FIG. 2). In various implementations, the objective lens 350, tube lens 351, or any of the other lenses referenced herein may be formed from or operate in conjunction with individual lenses, compound lenses, etc. The tube lens 351 receives the workpiece light 355 and outputs it to the relay lens 352.

The relay lens 352 receives the workpiece light 355 and outputs it to the VFL lens 370. The VFL lens 370 receives the workpiece light 355 and outputs it to the relay lens 386. The relay lens 386 receives the workpiece light 355 and outputs it to an optical detector 360 (e.g., a camera, a confocal optical detector, etc.) of the focus determining portion 375. In various implementations, the optical detector 360 may capture an image of the workpiece 320 during an image exposure period, and may provide the image to a control system portion (e.g., similar to the operation of the optical detector 260 for providing an image to the control system portion 120 in FIG. 2).

In various implementations, the VFL lens system 300 may also or alternatively include an optional beamsplitter 361', an optional tube lens 386' and an optional focus determining portion 375'. The optional focus determining portion 375' may include an optional optical detector 360' and an optional focus signal processing portion 377'. In operation, the beamsplitter 361' may be configured to split the workpiece light 355 and output workpiece light 355' to the tube lens 386'. The tube lens 386' may be configured to output the workpiece light 355' to the optical detector 360'. In one implementation, the optical detector 360' may include a confocal optical detector, which may be configured to operate according to confocal principles, as will be understood by one skilled in the art.

As will be described in more detail below, in various implementations, the optical detector 360 (or 360') may be configured to input light from the imaging system including the VFL lens 370, and the focus signal processing portion 377 (or 377') may be configured to determine raw phase timing signal values corresponding to when signal data from the optical detector indicates that an imaged surface region (e.g., of the workpiece 320) is at a focus position. For example, in an implementation where the optical detector 360 is a camera, the signal data may correspond to one or more images acquired by the camera (e.g., an image stack), wherein contrast determinations such as points-from-focus operations or other analysis may be performed to determine when an imaged surface region of the workpiece 320 is at a focus position. Exemplary techniques for the determination and analysis of image stacks and focus curves, and for points-from-focus operations, are taught in U.S. Pat. Nos. 6,542,180 and 9,060,117, each of which is commonly assigned and hereby incorporated herein by reference in its entirety. As another example, in an implementation where the optical detector 360' is a confocal optical detector that is included as part of a confocal configuration, the signal data may correspond to a sensed level of confocal brightness. In such an implementation, the confocal optical detector 360' may be utilized during the periodic modulation of the optical power of the VFL lens 370 to determine when a maximum confocal brightness occurs, as corresponding to a focus position and as indicating a corresponding Z-height of an imaged surface region of the workpiece 320.

In an implementation where the VFL lens system 300 includes the focus determining portion 375' with the focus signal processing portion 377' and the optical detector 360' (e.g., a confocal optical detector), the optical detector 360 (e.g., a camera) may not need to be utilized for focus position determination. More specifically, in such an implementation, the optical detector 360' may be utilized for the focus determining functions, while the camera 360 may be utilized for imaging (e.g., and the focus signal processing portion 377 in some instances may not need to be included). Conversely, if the VFL lens system 300 does not include the focus determining portion 375' and only includes the focus determining portion 375, the camera 360 may be utilized for the focusing functions. As another alternative, in various implementations the VFL lens system 300 may include only the focus determining portion 375' with a confocal optical detector 360', and may not include the focus determining portion 375 with the camera 360 (e.g., when the VFL lens system 300 is included as part of a stand-alone confocal instrument, etc.).

The VFL lens 370 is electronically controllable to vary the focus position FP of the imaging system (e.g., during one or more image exposures, during a confocal brightness determination, etc.). The focus position FP may be moved within a range R bound by a focus position FP1 and a focus position FP2. It will be appreciated that in various implementations, the range R may be selected by a user or may result from design parameters or may otherwise be automatically determined. In general with respect to the example of FIG. 3, it will be appreciated that certain of the illustrated dimensions may not be to scale. For example, the VFL lens 370 may have different proportional dimensions than those illustrated (e.g., may be less wide and up to 50 mm long or longer for certain applications in order to provide a desired amount of lensing power, etc.).

In various implementations, a machine vision inspection system may comprise a control system (e.g., the control system 120 of FIG. 2) that is configurable to operate in conjunction with a lens controller 371 or to otherwise control the VFL lens 370 to periodically modulate a focus position of the VFL lens system 300. In some implementations, the VFL lens 370 may very rapidly adjust or modulate the focus position (e.g., periodically, at a rate of at least 300 Hz, or 3 kHz, or 70 kHz, or much higher). In one example implementation, the range R may be approximately 10 mm (e.g., for a 1× objective lens 350). In various implementations, the VFL lens 370 is advantageously chosen such that it does not require any macroscopic mechanical adjustments in the imaging system and/or adjustment of the distance between the objective lens 350 and the workpiece 320 in order to change the focus position FP. In such a case, as described in the previously incorporated '980 publication, an extended depth of field image may be acquired. Furthermore there are no macroscopic adjustment elements or associated positioning non-repeatability to degrade accuracy when the same imaging system is used for acquiring fixed focus inspection images, which may be used for precision measurements (e.g., for accuracies on the order of a few micrometers, or tenths of micrometers, or less, and the like). As described in the previously incorporated '726 publication, the changes in the focus position FP may also be utilized to rapidly acquire an image stack including a plurality of images at a plurality of positions along a Z-height direction proximate to the workpiece 320.

In various implementations, the VFL lens 370 may be a tunable acoustic gradient index of refraction ("TAG") lens. A tunable acoustic gradient index of refraction lens is a high-speed VFL lens that uses sound waves in a fluid medium to modulate a focus position and may periodically sweep a range of focal lengths at a frequency of several hundred kHz. Such a lens may be understood by the teachings of the article, "High-speed varifocal imaging with a tunable acoustic gradient index of refraction lens" (Optics Letters, Vol. 33, No. 18, Sep. 15, 2008), which is hereby incorporated herein by reference in its entirety. Tunable acoustic gradient index lenses and related controllable signal generators are available, for example, from TAG Optics, Inc., of Princeton, N.J. The Model TL2.B.xxx series lenses, for example, are capable of modulation up to approximately 600 KHz.

In various implementations, as described in more detail in the previously incorporated '726 publication, the optical detector 360 may comprise a sensor with a global shutter, i.e., a sensor, that exposes each pixel simultaneously. Such an implementation is advantageous in that it provides the capability to measure image stacks without motion of a workpiece or any part of the VFL lens system 300. In various alternative implementations, the optical detector 360 may comprise a sensor with an electronic rolling shutter (ERS) system. For example, a camera system may comprise a black and white CMOS sensor using SXGA resolution coupled with an electronic rolling shutter (ERS) system (e.g., model MT9M001 from Aptina Imaging of San Jose, Calif.).

The VFL lens 370 may be driven by the lens controller 371, which may generate a signal to operate the VFL lens 370. In one embodiment, the lens controller 371 may be a commercial controllable signal generator. In some implementations, the lens controller 371 may be configured or controlled by a user and/or an operating program (e.g., through the lens controller/interface 271, as outlined previously with respect to FIG. 2). In some implementations, the lens controller 371 may control the VFL lens 370 to periodically modulate its optical power (e.g., sinusoidally) and thereby periodically modulate a focus position of the imaging system over a plurality of focus positions along a Z-height direction at a high operating frequency. For example, in some exemplary implementations, a tunable acoustic gradient index of refraction lens may be configured for focal scanning rates as high as 400 kHz, although it should be appreciated that slower focus position adjustments and/or modulation frequencies may be desirable in various implementations and/or applications. For example, in various implementations a periodic modulation of 300 Hz, or 3 kHz, or 70 kHz, or 250 kHz, or the like may be used. In implementations where slower focus position adjustments are used, the VFL lens 370 may comprise a controllable fluid lens, or the like. In various implementations, the periodically modulated VFL lens optical power may define a first periodic modulation phase.

In various implementations, the lens controller 371 may include a drive signal generator portion 372 and a Z-height versus phase calibration portion 373. The drive signal generator portion 372 may operate (e.g., in conjunction with a timing clock 372') to provide a periodic signal. In various implementations, a phase timing signal may be provided by the lens controller 371 that is synchronized with the periodical signal of the drive signal generator portion 372. In various implementations, the periodic signal may have the same operating frequency as the periodically modulated VFL lens optical power, and may have a second periodic modulation phase that has a phase offset relative to the first periodic modulation phase of the periodically modulated VLF lens optical power. In various implementations, the Z-height versus phase calibration portion 373 may provide a first Z-height versus phase characterization that relates respective Z-heights to respective phase timing signal values.

In various implementations, the optical detector 360 (or 360') may be configured to input light from the imaging system including the VFL lens 370, and the focus signal processing portion 377 (or 377') may be configured to determine raw phase timing signal values corresponding to when signal data from the optical detector indicates that an imaged surface region (e.g., of the workpiece 320) is at a focus position. As will be described in more detail below with respect to FIG. 5, the raw phase timing signal values may include a phase offset contribution as related to the phase offset between the first and second periodic modulation phases. As will also be described in more detail below, the phase offset compensating portion 378 may be configured to input raw phase timing signal values corresponding to imaged surface regions and perform a phase offset compensating process that provides Z-height measurements of the imaged surface regions, wherein at least one of Z-height errors or Z-height variations that are related to the phase offset contribution are at least partially eliminated. In various implementations, a phase offset estimation portion 379 of the phase offset compensating portion 378 may determine an estimated value of the phase offset, which may be utilized as part of the phase offset compensating process.

In the example of FIG. 3, the relay lenses 352 and 386 and the VFL lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. As part of the Keplerian telescope configuration, a focal distance $F_{TUBE}$ of the tube lens 351 is illustrated as being approximately equidistant to a midpoint between the lenses 351 and 352, as is a focal distance f of the relay lens 352. In alternative implementations, the focal distance $F_{TUBE}$ for the tube lens 351 may be made to be different than the focal distance f of the relay lens 352 (which corresponds to one of the 4 f's of the 4f optical configuration). In various implementations where the tube lens 351 may be included as part of a turret lens assembly, it may be desirable for other tube lenses of the turret lens assembly when rotated into the operational position to have a focal point at the same location (i.e., so as to meet the focal point of the relay lens 352).

As described in more detail in the previously incorporated '409 application, the ratio of the focal distance $F_{TUBE}$ to the focal distance f can be utilized to alter the diameter of the collimated beam of workpiece light 355 out of the relay lens 352 relative to the collimated beam of the workpiece light 355 that is input to the tube lens 351. It will be appreciated with respect to the collimated beams of workpiece light 355 that are respectively input to the tube lens 351 and output from the relay lens 352, that in various implementations such collimated beams may be extended into longer path lengths and/or beam splitters may be utilized with respect to such collimated beams for providing additional optical paths (e.g., as directed to different camera systems, etc.).

In various implementations, the illustrated 4f optical configuration permits placing the VFL lens 370 (e.g., which may be a low numerical aperture (NA) device, such as a tunable acoustic gradient index of refraction lens), at the Fourier plane of the objective lens 350. This configuration may maintain the telecentricity at the workpiece 320 and may minimize scale change and image distortion (e.g., including providing constant magnification for each Z-height of the workpiece 320 and/or focus position FP). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL lens, so as to minimize image aberrations, etc.

It will be appreciated that in various implementations, certain types of dimensional measurements may require near-diffraction or diffraction-limited imaging. The configuration illustrated in FIG. 3 reduces aberrations by restricting the off-axis extent of the pupil of the objective lens 350 that is imaged into the VFL lens 370. In this configuration, the radial extent may be maintained to be less than the radial extent of the 1st Bessel ring in the refractive index profile of the standing wave of the VFL lens 370 (e.g., a tunable acoustic gradient index of refraction lens) at its lowest resonant frequency $f_{R,MIN}$, as described in more detail in the previously incorporated '409 application. In this manner, light from the microscope configuration (i.e., including the objective lens 350 and the tube lens 351) does not exceed the largest clear aperture $CA_{VFL,MAX}$ of the VFL lens 370. In an implementation where the light did exceed the largest clear aperture, the light could interact with the region of the standing wave of the VFL lens 370 that may have an undesirable refractive index, which could increase aberrations and reduce dimensional measurement precision. Some example operations of the VFL lens system 300 will be described in more detail below with respect to FIGS. 4 and 5.

Figure 4:
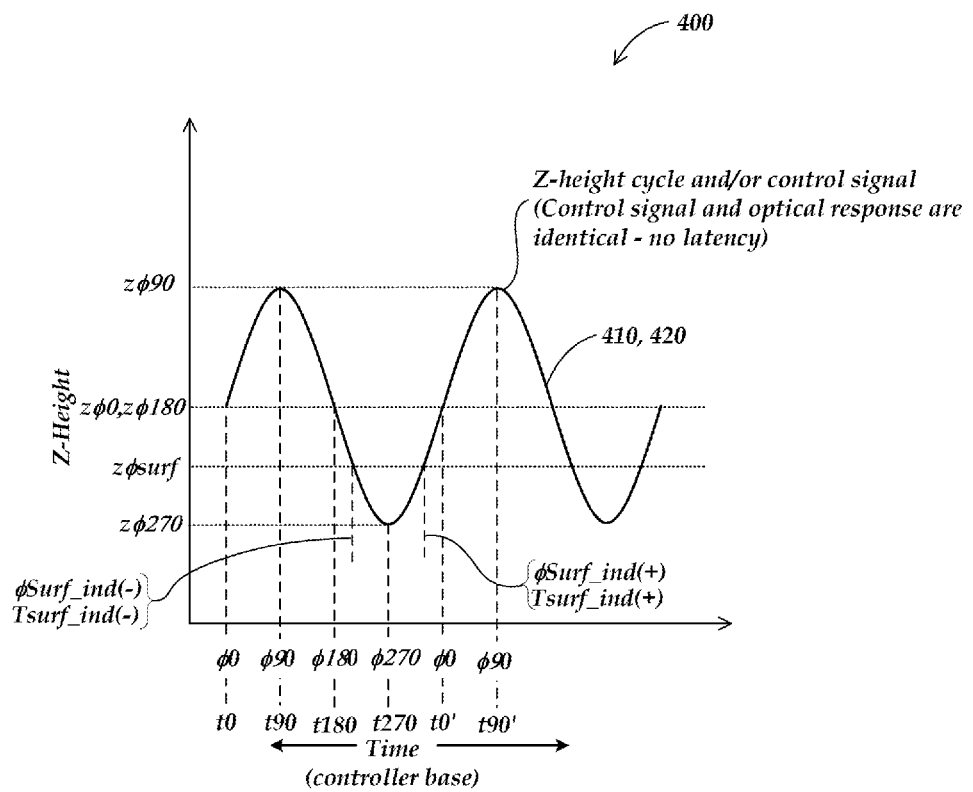
FIG. 4 is a timing diagram illustrating phase timings for a periodically modulated control signal and optical response of the variable focal length lens system of FIG. 3.

FIG. 4 is a timing diagram 400 illustrating phase timings for a periodically modulated control signal 410 and optical response 420 of the VFL lens system of FIG. 3. In the example of FIG. 4, an ideal case is illustrated in which the control signal 410 and the optical response 420 have similar phase timings and are thus represented as identical signals (e.g., in contrast to the example of FIG. 5 where the signals are separated by a phase offset, as will be described in more detail below). In various implementations, the control signal 410 may be related to the drive signal that is produced by the drive signal generator 372 of FIG. 3, and the optical response 420 may be representative of the periodically modulated focus position of the imaging system which is controlled by periodically modulating the optical power of the VFL lens 370, as outlined above.

In various implementations, the sinusoidal shapes of the curves 410 and 420 may depend on the lenses in series (e.g., the objective lens 350, VFL lens 370, etc., as illustrated in FIG. 2), for which the optical power of the VFL lens 370 goes through a cycle as indicated in FIG. 4 and is equal to 1/f (where f=focal length). As will be described in more detail below, a Z-height versus phase characterization that relates respective Z-heights to respective phase timing signal values may be established by calibration according to known principles (e.g., in accordance with a mathematical model and/or by repeatedly stepping a surface to a known Z-height, and then manually or computationally determining the phase timing that best focuses an image at the known Z-height, and storing that relationship in a lookup table or the like).

The timing diagram 400 illustrates phase timings (e.g., $\phi 0$, $\phi 90$, $\phi 180$, $\phi 270$, etc.) which are equal to respective phase timing signal values (e.g., t0, t90, t180, t270, etc.) of the control signal 410, which correspond to respective Z-heights (e.g., $z\phi 0$, $z\phi 90$, $z\phi 180$, $z\phi 270$, etc.). In various implementations, the phase timing signal values (e.g., t0, t90, t180, t270, etc.) may be determined according to a phase timing signal (e.g., as provided by a clock or other technique for establishing a timing relative to the periodic modulation, etc.). It will be understood that the phase timing signal values shown in the timing diagram 400 are intended to be exemplary only and not limiting. More generally, any phase timing signal value will have an associated focus position Z-height within the illustrated range of focus positions (e.g., the range in the illustrated example having a maximum Z-height z$\phi$90 and a minimum Z-height z$\phi$270).

As described above, various techniques (e.g., utilizing points from focus, maximum confocal brightness determinations, etc.) may be used to determine when an imaged surface region is in focus, which may correspond to a Z-height measurement for the imaged surface region. For example, an imaged surface region may be determined to be at a Z-height z$\phi$surf according to when the imaged surface region is in focus. That is, in the illustrated example, at the phase timing $\phi$surf_ind(−), which is equal to the phase timing signal value Tsurf_ind(−), the focus position is at the Z-height z$\phi$surf, and a workpiece surface region located at the Z-height z$\phi$surf will be in focus. Similarly, at the phase timing $\phi$surf_ind(+), which is equal to the phase timing signal value Tsurf_ind(+), the focus position is at the Z-height z$\phi$surf, and the workpiece surface region located at the Z-height z$\phi$surf will be in focus. It will be appreciated that such values may be included in the Z-height versus phase characterization that relates respective Z-heights to respective phase timing signal values, such that when an imaged surface region is determined to be in focus, the corresponding phase timing signal value (e.g., Tsurf_ind(−)) may be utilized to look up the corresponding measured Z-height (e.g., Z-height z$\phi$surf) of the imaged surface region.

In the illustrated example, the phase timing signal values Tsurf_ind(−) and Tsurf_ind(+) correspond to movements of the modulated focus position in respective opposite directions. More specifically, the phase timing signal value Tsurf_ind(−) corresponds to movement of the modulated focus position in a first direction (e.g., downward), while the phase timing signal value Tsurf_ind(+) corresponds to movement of the modulated focus position in a second direction (e.g., upward) that is opposite to the first direction. Due to the control signal 410 and the optical response 420 having similar phase timings in the example of FIG. 4, the phase timing signal values Tsurf_ind(−) and Tsurf_ind(+) of the control signal 410 are shown to correspond to the same Z-height z$\phi$surf. In contrast, as will be described in more detail below with respect to FIG. 5, when the optical response 420 has a phase offset relative to the control signal 410, different Z-heights may be indicated as corresponding to such phase timing signal values, for which a phase offset compensating process may be utilized in accordance with the principles disclosed herein.

Figure 5:
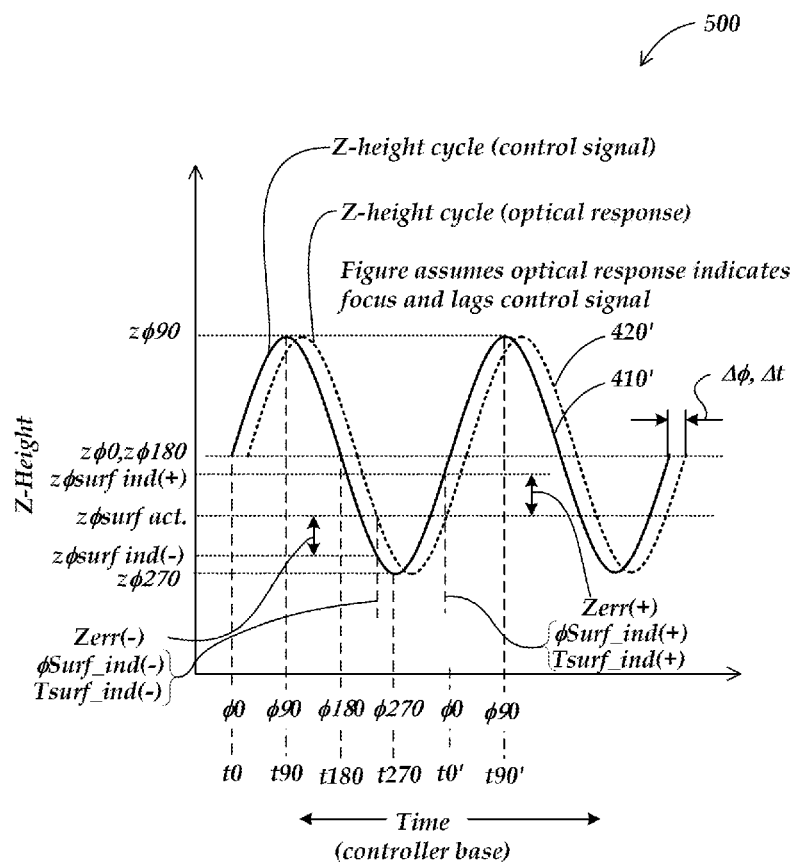
FIG. 5 is a timing diagram illustrating a phase offset between a periodically modulated control signal and an optical response of the variable focal length lens system of FIG. 3.

FIG. 5 is a timing diagram 500 illustrating a phase offset between a periodically modulated control signal 410' and an optical response 420' of the VFL lens system of FIG. 3. As illustrated in FIG. 5, a phase offset contribution corresponds to a delta phase timing $\Delta\phi$, which corresponds to a delta phase timing signal value $\Delta t$. As a result of the phase offset contribution, when an imaged surface region is actually at a Z-height z$\phi$surf_act, corresponding phase timing signal values relative to the optical response 420' may indicate other Z-heights relative to the control signal 410'.

That is, in the illustrated example, at the phase timing $\phi$surf_ind(−), which is equal to the phase timing signal value Tsurf_ind(−) the optical response 420' corresponds to the focus position being at the Z-height z$\phi$surf_act, however the control signal 410' incorrectly indicates that the focus position is at the Z-height z$\phi$surf_ind(−). The difference between the Z-height z$\phi$surf_act and the Z-height z$\phi$surf_ind(−) is shown to be a Z-height error Zerr(−). Similarly, at the phase timing $\phi$surf_ind(+), which is equal to the phase timing signal value Tsurf_ind(+), the optical response 420' corresponds to the focus position being at the Z-height z$\phi$surf_act, however the control signal 410' incorrectly indicates that the focus position is at the Z-height z$\phi$surf_ind(+). The difference between the Z-height z$\phi$surf_act and the Z-height z$\phi$surf_ind(+) is shown to be a Z-height error Zerr(+).

As noted above, the phase timing signal value Tsurf_ind(−) corresponds to movement of the modulated focus position in a first direction (e.g., downward), while the phase timing signal value Tsurf_ind(+) corresponds to movement of the modulated focus position in a second direction (e.g., upward) that is opposite to the first direction. As illustrated, the corresponding Z-height errors Zerr(−) and Zerr(+) may also correspondingly be relatively opposite to one another (e.g., relative to the Z-height z$\phi$surf_act). In various implementations, the opposite nature of the Z-height errors Zerr(−) and Zerr(+) may be utilized as part of a phase offset compensating process. In accordance with the principles disclosed herein, different phase offset compensating processes may be utilized in various implementations, as will be described in more detail below.

For example, in one configuration a phase offset compensating process may include determining a Z-height measurement of an imaged surface region based on a corresponding set of raw phase timing signal values comprising at least first and second respective subsets of raw phase timing signal values corresponding to movements of the modulated focus position of the imaging system in respective opposite directions. With respect to the example of FIG. 5, a first respective subset of raw phase timing signal values may include at least the phase timing signal value Tsurf_ind(−), and may also include similar phase timing signal values determined during subsequent VFL lens cycles (e.g., within the next VFL lens cycle another phase timing signal value may again be determined when the imaged surface region is again in focus during movement of the modulated focus position in the downward direction, and so on). Similarly, a second respective subset of raw phase timing signal values may include at least the phase timing signal value Tsurf_ind(+), and may also include similar phase timing signal values determined during subsequent VFL lens cycles (e.g., within the next VFL lens cycle another phase timing signal value may again be determined when the imaged surface region is again in focus during movement of the modulated focus position in the upward direction, and so on).

In one implementation, such a phase offset compensating process may more specifically begin with determining a first preliminary Z-height measurement subset (e.g., including at least the Z-height z$\phi$surf_ind(−)) based on at least one value in the first subset of raw phase timing signal values (e.g., the raw phase timing signal value Tsurf_ind(−)) and the first Z-height versus phase characterization. The process may also include determining a second preliminary Z-height measurement subset (e.g., including at least the Z-height z$\phi$surf_ind(+)) based on at least one value in the second subset of raw phase timing signal values (e.g., the raw phase timing signal value Tsurf_ind(+)) and the first Z-height versus phase characterization. The process may further include determining a Z-height measurement value (e.g., Z-height z$\phi$surf_act) that is intermediate between at least one value (e.g., Z-height z$\phi$surf_ind(−)) in the first preliminary Z-height measurement subset and at least one value (e.g., Z-height z$\phi$surf_ind(+)) in the second preliminary Z-height measurement subset, and using the determined Z-height measurement (e.g., Z-height z$\phi$surf_act) as a Z-height measurement value of the imaged surface region. In various implementations, the Z-height measurement value (e.g., Z-height z$\phi$surf_act) may be determined as the average of at least one value (e.g., Z-height zφsurf_ind(−)) in the first preliminary Z-height measurement subset and at least one value (e.g., Z-height zφsurf_ind(+)) in the second preliminary Z-height measurement subset. In various implementations, a controller of the VFL lens system may restrict the operating range of the imaging system to be at less than ⅔ of the maximum operating range and so as to not include peaks or troughs of a periodic signal in the controller (e.g., so as to utilize the above described phase offset compensating process during the relatively linear portions of the sinusoidal curves 410' and/or 420', as opposed to the non-linear portions that occur at the peaks and troughs, etc.).

As another example, in a different configuration a phase offset compensating process may be configured to determine an estimated value of the phase offset and may include a Z-height determination process for determining a Z-height measurement of an imaged surface region based on at least one corresponding raw phase timing signal value and the estimated value of the phase offset. In such a configuration, the Z-height determination process may include determining a compensated phase timing signal value by processing the at least one corresponding raw phase timing signal value with the estimated value of the phase offset to reduce the phase offset contribution, and may further include determining a Z-height measurement based on the compensated phase timing signal value and the first Z-height versus phase characterization. In one implementation, the phase offset compensating portion may include a phase offset estimation portion that is operable to perform an adjustment process that adjusts the estimated value of the phase offset to satisfy a criteria. In one implementation, the criteria is such that when the Z-height determination process is based on the adjusted estimated value of the phase offset and is repeated corresponding to at least first and second respective subsets of raw phase timing signal values corresponding to movements of the modulated focus position of the imaging system in respective opposite directions when imaging a fixed surface region, at least one of a variance or a difference between the resulting opposite-direction Z-height measurements is approximately minimized. With respect to the example of FIG. 5, a first respective subset of raw phase timing signal values may include at least the phase timing signal value Tsurf_ind(−), with a resulting Z-height measurement of Z-height zφsurf_ind(−)), and a second respective subset of raw phase timing signal values may include at least the phase timing signal value Tsurf_ind(+), with a resulting Z-height measurement of Z-height zφsurf_ind(+)). The variance and/or difference between the resulting opposite-direction Z-height measurements in this instance may be equal to the sum of the Z-height errors Zerr(−) and Zerr(+). As will be described in more detail below with respect to FIG. 7, in one implementation the estimated value of the phase offset may be adjusted (e.g., in incremental steps) to determine an estimated value of the phase offset which results in a minimized variance or difference between the resulting opposite-direction Z-height measurements (e.g., so as to achieve a configuration that is more comparable to the example of FIG. 4 where the phase timing signal values Tsurf_ind(−) and Tsurf_ind(+) of the control signal 410' are made to come closer to corresponding to the same Z-height zφsurf_act).

As another example, in another configuration where an estimated value of the phase offset is determined and adjusted, a phase offset compensating process may include imaging a fixed surface region and determining a corresponding set of raw phase timing signal values comprising at least first and second respective subsets of raw phase timing signal values corresponding to movements of the modulated focus position of the imaging system in respective opposite directions. In such a configuration, the first and second respective subsets of raw phase timing signal values may be nominally symmetrically spaced around the 90-degree phase or the 270-degree phase of the first periodic modulation phase, and the estimated value of the phase offset may be adjusted based on the first and second respective subsets of raw phase timing signal values. With respect to the example of FIG. 5, a first respective subset of raw phase timing signal values may include at least the phase timing signal value Tsurf_ind(−), and may also include similar phase timing signal values determined during subsequent VFL lens cycles, and a second respective subset of raw phase timing signal values may include at least the phase timing signal value Tsurf_ind(+), and may also include similar phase timing signal values determined during subsequent VFL lens cycles. Such first and second respective subsets of raw phase timing signal values will be nominally symmetrically spaced around the 270-degree phase of the first periodic modulation phase of the optical response 420', as illustrated in FIG. 5 with respect to the spacing of the raw phase timing signal values Tsurf_ind(−) and Tsurf_ind(+).

In one implementation, the operation of adjusting the estimated value of the phase offset based on the first and second respective subsets of raw phase timing signal values may begin with approximating the first peak phase timing signal value of the 90-degree phase or 270-degree phase of the first periodic modulation phase as an average value of the first and second respective subsets of raw phase timing signal values (e.g., the average value between the raw phase timing signal values Tsurf_ind(−) and Tsurf_ind(+) for the 270-degree phase). The operation may also include establishing a second peak phase timing signal value of the corresponding 90-degree phase or 270-degree phase of the second periodic modulation phase based on the phase timing signal being synchronized with the periodic signal in the controller that has the second periodic modulation phase (e.g., the phase timing signal value t270). The operation may further include adjusting the estimated value of the phase offset to a value corresponding to a difference between the first and second peak phase timing signal values (e.g., so as to achieve a configuration comparable to the example of FIG. 4 where the phase timing signal values Tsurf_ind(−) and Tsurf_ind(+) of the control signal 410' are made to come closer to corresponding to the same Z-height zφsurf_act).

In various implementations, the control signal 410' may be related to various other signals that are produced and/or determined by the VFL lens system. For example, synchronization pulses may be produced by certain electronic circuits or routines of the VFL lens system, and may be synchronized such that they occur at specified phase locations along an optical response and/or drive signal (e.g., as produced by the drive signal generator 372 of FIG. 3). In some instances, documentation may be provided regarding VFL lenses and/or systems that may indicate that provided synchronization pulses are intended to occur at specified locations on a power curve (e.g., the optical response 420'). However, in practice it has been observed that there may be a delay (e.g., a phase delay) between the specified and actual synchronization pulse locations. In addition, it has been observed that this delay tends to vary depending on conditions (e.g., temperature, etc.). In various implementations, the control signal 410' may be a synthetic signal that is representative of, or otherwise synchronized with, the timing of such synchronization pulses, and may correspond to the values of a Z-height versus phase characterization. In one implementation, synchronization pulses may be synchronized with the drive signal that is produced by the drive signal generator 372 of FIG. 3, and may occur at specified phase locations along the drive signal. For example, in various implementations, the optical response 420' may have a phase offset relative to the drive signal, and the control signal 410' (e.g., as representative of the timing of the synchronization pulses) may be synchronized with the drive signal but may also have a phase offset relative to the drive signal. In one implementation, a phase timing signal (e.g., a provided by a clock, etc.) may be synchronized with the control signal 410' and/or corresponding synchronization pulses.

Figure 6:
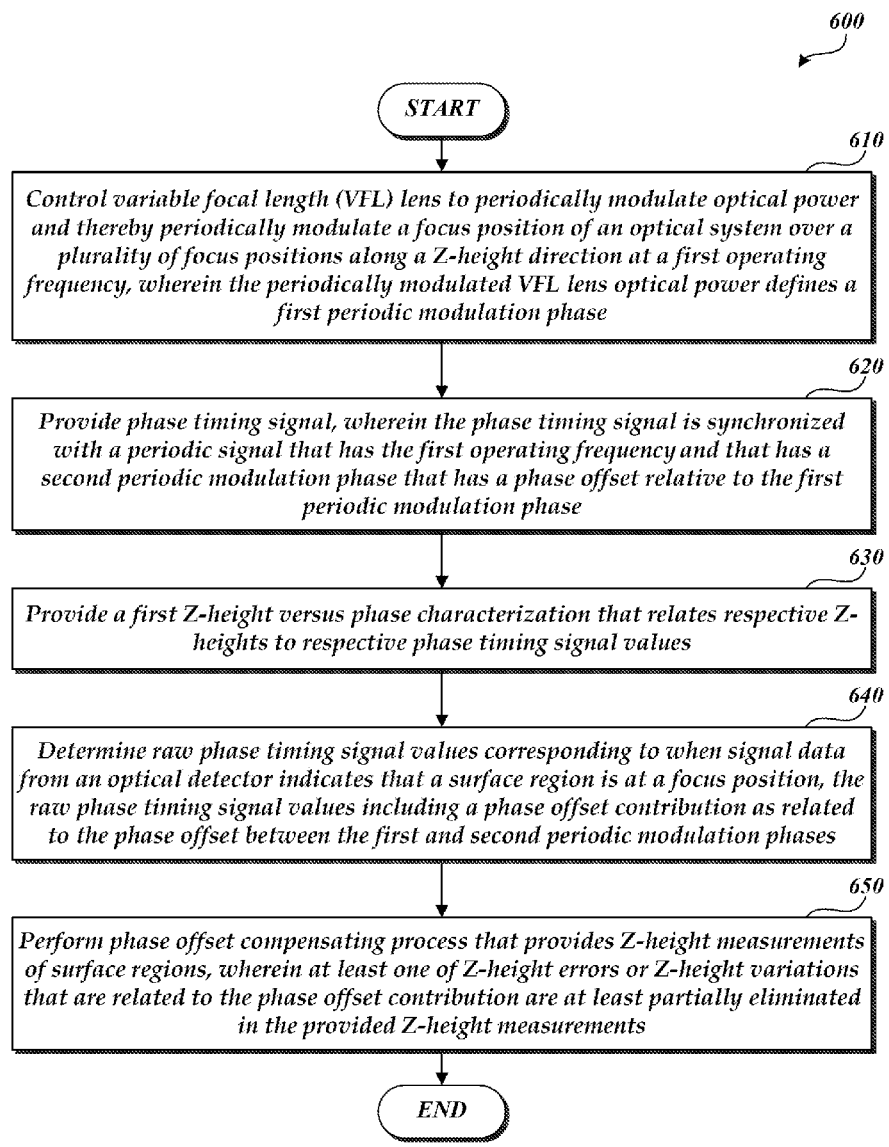
FIG. 6 is a flow diagram illustrating one exemplary implementation of a routine for determining a surface Z-height measurement of a surface region.

FIG. 6 is a flow diagram illustrating one exemplary implementation of a routine 600 for determining a surface Z-height measurement of a surface region. At a block 610, a VFL lens is controlled to periodically modulate its optical power and thereby periodically modulate a focus position of an optical system over a plurality of focus positions along a Z-height direction at a first operating frequency, wherein the periodically modulated VFL lens optical power defines a first periodic modulation phase. At a block 620, a phase timing signal is provided, wherein the phase timing signal is synchronized with a periodic signal that has the first operating frequency and that has a second periodic modulation phase that has a phase offset relative to the first periodic modulation phase.

At a block 630, a first Z-height versus phase characterization is provided that relates respective Z-heights to respective phase timing signal values. At a block 640, raw phase timing signal values are determined corresponding to when signal data from an optical detector indicates that a surface region is at a focus position, the raw phase timing signal values including a phase offset contribution as related to the phase offset between the first and second periodic modulation phases. At a block 650, a phase offset compensating process is performed that provides Z-height measurements of surface regions, wherein at least one of Z-height errors or Z-height variations that are related to the phase offset contribution are at least partially eliminated in the provided Z-height measurements.

Figure 7:
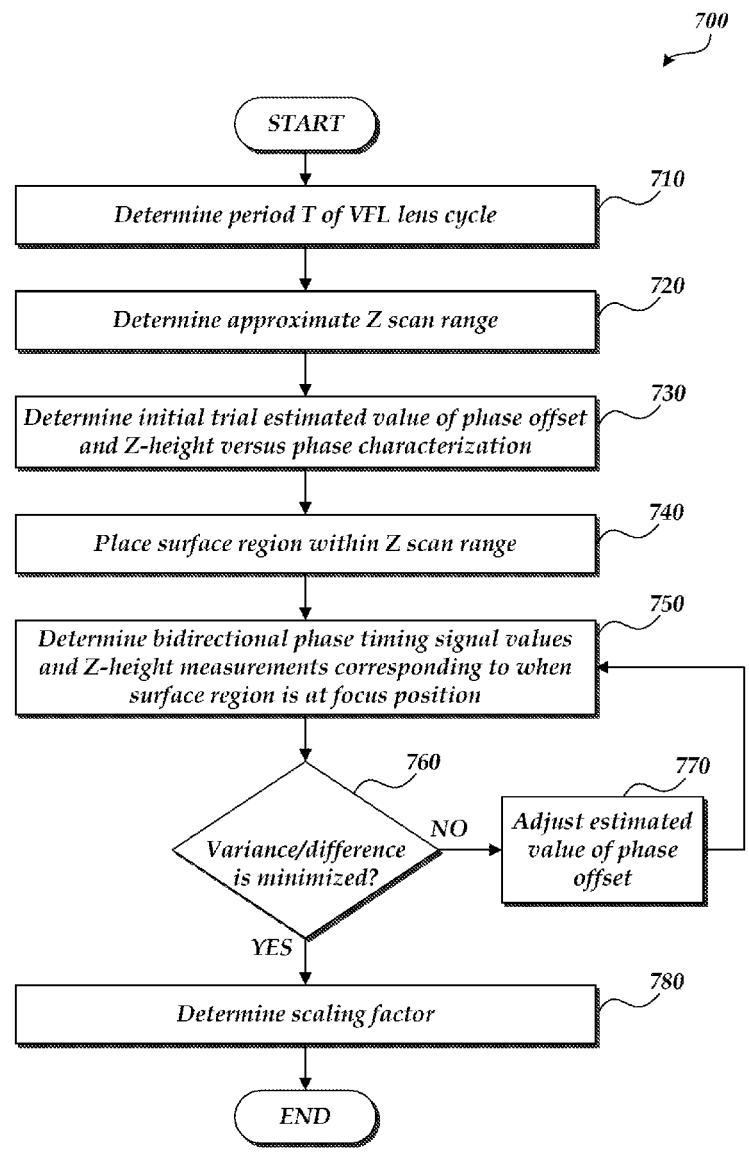
FIG. 7 is a flow diagram illustrating one exemplary implementation of a routine for determining an estimated value of a phase offset.

FIG. 7 is a flow diagram illustrating one exemplary implementation of a routine 700 for determining an estimated value of a phase offset. In the case that the routine 700 is used in a calibration procedure to create or adjust a Z-height versus phase characterization, to be used as outlined herein, the routine 700 may also determine a scaling factor corresponding to the actual Z-scan range of the focus of the VFL lens system.

At a block 710, a period T of the modulation cycle of the VFL lens system is determined. In various implementations, various techniques may be utilized for determining the period T of the periodic modulation cycle. For example, in a configuration where synchronization pulses are generated (e.g., by certain electronic circuits or routines of the VFL lens system, etc.), the period T may be computed as an average period between two synchronization pulses. In an implementation where a high sampling frequency is utilized (e.g., thousands of samples of measured Z-heights per periodic modulation cycle), a median number of samples between two synchronization pulses may be utilized in some instances to determine the period T of the periodic modulation cycle. At a block 720, an approximate Z-scan range of the VFL lens system is determined. In various implementations, the approximate Z-scan range may be based on an optical model of the VFL lens system.

At a block 730, an initial trial estimated value of a phase offset and a Z-height versus phase characterization that relates respective Z-heights to respective phase timing signal values is determined. In various implementations, the Z-height versus phase characterization may be determined based on the period T and the approximate Z-scan range, as well as the initial trial estimated value of the phase offset. In various implementations, the Z-height versus phase characterization may be based on a mathematical or other model (e.g., as including values that correspond to a sine or cosine wave with the specified Z-range, period T, and initial trial estimated value of the phase offset, etc.), or on Z-height-phase characteristics of the system measured experimentally (e.g., a lookup table interpolated using various methods, such as linear approximation, spline interpolation, sine wave fitting, etc.). In various implementations, it may be desirable to make the number of values in the Z-height versus phase characterization approximately equal to the number of samples (e.g., measured Z-heights) that occur between two synchronization pulses, which in some instances may depend on the sampling rate of the VFL lens system. In various implementations, different sampling rates (e.g., thousands of samples per cycle, etc.) may be utilized depending on the desired accuracy of the system.

At a block 740, a surface region (e.g., a mirror in the case of a calibration procedure) is positioned within the VFL lens system Z-scan range. In various implementations, it may be desirable to place the surface region approximately in the middle of the Z-scan range. In implementations where other scan capabilities (e.g., for lateral scans, etc.) are included as part of the VFL lens system, it may be desirable to turn off or otherwise disable such other types of scans in order to reduce the influence of other optical errors on the Z variability of the measured surface location. More specifically, in certain implementations it is desirable to measure repeatedly exactly the same spot on an image surface region of a stationary calibration surface using the Z-height scan capabilities of the VFL lens system.

At a block 750, bidirectional phase timing signal values and corresponding Z-height measurements are determined corresponding to when the stationary imaged surface region is at focus position. As described above with respect to FIG. 5, in various implementations such operations may include performing a Z-height determination process based on the trial estimated value of the phase offset and repeating operations corresponding to at least first and second respective subsets of raw phase timing signal values corresponding to movements of the modulated focus position of the imaging system in respective opposite directions when imaging a fixed surface region. In various implementations, a number of Z-height measurements may be determined from multiple Z-scans using the current Z-height versus phase characterization. In various implementations, such as where a VFL lens 370 is being operated to scan continuously at a large number of cycles (e.g., thousands, etc.) per second, a Z-height measurement may be quickly determined for each Z-scan (e.g., in both the up and down directions, as described above with respect to FIGS. 4 and 5). In this manner, a large number (e.g., thousands, etc.) of Z-heights may be quickly accumulated (e.g., utilizing a confocal or other system, etc.) when a stationary surface spot on an imaged surface region is being measured.

At a decision block 760, a determination is made as to whether at least one of a trial variance or difference is at least approximately minimized. For example, a standard deviation calculation may be applied to the determined Z-height measurements (e.g., computing their sigma), for determining an overall trial variance or difference. If the overall trial variance or difference has not been sufficiently minimized, the routine proceeds to a block 770, where the trial estimated value of the phase offset is adjusted. For example, the trial estimated value of the phase offset may be adjusted by an incremental step (e.g., 0.1-degree phase steps, etc.) or other technique, so as to provide a new trial estimated value of the phase offset. However, this implementation of adjusting the estimated phase offset is exemplary only, and not limiting. For example, in one alternative adjustment method, respective difference or variance values may be determined for a plurality of respective phase offsets over an estimated or predetermined range, which may define a corresponding curve of data points. The minimum of the curve (the minimum variance or difference) may be found by known methods (curve fitting and peak or valley finding, etc.), and the corresponding phase offset value may be used for the estimated phase offset. This may result in an "ideal" and precise adjustment, to an interpolated phase offset value between the initial values used for establishing the curve. These and other alternative methods for performing the operations of block 770 may be apparent to one of ordinary skill in the art based on the various teachings included herein.

If the trial variance or difference is at least approximately minimized, the routine proceeds to a block 780. In various implementations, once the trial variance or difference has been determined to be minimized (e.g., after performing the operations of blocks 750 to 770 as needed to satisfy the requirement(s) of block 760), the corresponding trial estimated value of the phase offset may be utilized as the estimated value of the phase offset for subsequent Z-height measurement operations of the VFL lens system. In various implementations, the estimated value of the phase offset may be utilized as part of one or more processes for individually or collectively determining measured Z-heights, or may be utilized to adjust a previously determined Z-height versus phase characterization to take into account a drift or change in the phase offset. In other words, if an "original" phase offset that corresponds to or underlies a previously determined Z-height versus phase characterization has changed, the difference between it and the new estimated value of the phase offset may be used to shift or adjust the Z-height versus phase characterization to be correct in light of the new estimated value of the phase offset.

At a block 780, in the case that the routine 700 is being used in a calibration procedure to create or adjust a Z-height versus phase characterization, a scaling factor is determined (e.g., for scaling respective Z-height values, etc.). In various implementations, the determination of the scaling factor may include utilization of a calibration object with a known Z-step height, or a single surface may be displaced in Z by a known amount, etc. To determine the scaling factor, the calibration object with the known Z-step height or the surface displaced in Z by a known amount is measured in order to determine corresponding first and second Z-height measurements (e.g., utilizing a Z-height determination process based at least in part on determined first and second corresponding raw phase timing signal values and the estimated value of the phase offset, etc.). A measured Z-height difference is correspondingly determined that corresponds to the difference between the first and second Z-height measurements. A scaling factor is then determined which when multiplied by, or otherwise applied to, the measured Z-height difference results in a value that is equal to the known Z-height difference. In effect, one may understand that this scaling factor can be used to precisely calibrate the range or amplitude of the Z-height focus variations of the VFL lens system. Such a scaling factor can be used to establish the Z-height values used in the Z-height versus phase characterization, or to adjust the Z-height values used in an adjusted Z-height versus phase characterization, if needed or desired.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A variable focal length (VFL) lens system that provides a surface Z-height measurement of an imaged surface region, the VFL lens system comprising:
   an imaging system including a VFL lens;
   a controller configured to:
      control the VFL lens to periodically modulate its optical power and thereby periodically modulate a focus position of the imaging system over a plurality of focus positions along a Z-height direction at a first operating frequency, wherein the periodically modulated VFL lens optical power defines a first periodic modulation phase;
      provide a phase timing signal, wherein the phase timing signal is synchronized with a periodic signal in the controller that has the first operating frequency and that has a second periodic modulation phase that has a phase offset relative to the first periodic modulation phase; and
      provide a first Z-height versus phase characterization that relates respective Z-heights to respective phase timing signal values;
   a focus determining portion comprising:
      an optical detector that inputs light from the imaging system; and
      a focus signal processing portion configured to determine raw phase timing signal values corresponding to when signal data from the optical detector indicates that an imaged surface region is at a focus position, the raw phase timing signal values including a phase offset contribution as related to the phase offset between the first and second periodic modulation phases; and
   a phase offset compensating portion configured to input raw phase timing signal values corresponding to imaged surface regions and perform a phase offset compensating process that provides Z-height measurements of the imaged surface regions, wherein at least one of Z-height errors or Z-height variations that are related to the phase offset contribution are at least partially eliminated.

2. The VFL lens system of claim 1, wherein the phase offset compensating process comprises determining a Z-height measurement of an imaged surface region based on a corresponding set of raw phase timing signal values comprising at least first and second respective subsets of raw phase timing signal values corresponding to movements of the modulated focus position of the imaging system in respective opposite directions.

3. The VFL lens system of claim 2, wherein the phase offset compensating process comprises:
   determining a first preliminary Z-height measurement subset based on at least one value in the first subset of raw phase timing signal values and the first Z-height versus phase characterization;
   determining a second preliminary Z-height measurement subset based on at least one value in the second subset of raw phase timing signal values and the first Z-height versus phase characterization; and
   determining a Z-height measurement value that is intermediate between at least one value in the first preliminary Z-height measurement subset and at least one value in the second preliminary Z-height measurement subset, and using the determined Z-height measurement as a Z-height measurement value of the imaged surface region.

4. The VFL lens system of claim 3, wherein the Z-height measurement value is determined as an average of at least one value in the first preliminary Z-height measurement subset and at least one value in the second preliminary Z-height measurement subset.

5. The VFL lens system of claim 3, wherein the controller restricts an operating range of the imaging system to be at less than ⅔ of the maximum operating range and so as to not include peaks or troughs of the periodic signal in the controller.

6. The VFL lens system of claim 1, wherein:
   the phase offset compensating portion is configured to determine an estimated value of the phase offset; and
   the phase offset compensating process comprises a Z-height determination process for determining a Z-height measurement of an imaged surface region based on at least one corresponding raw phase timing signal value and the estimated value of the phase offset, the Z-height determination process comprising:
      determining a compensated phase timing signal value by processing the at least one corresponding raw phase timing signal value with the estimated value of the phase offset to reduce the phase offset contribution; and
      determining a Z-height measurement based on the compensated phase timing signal value and the first Z-height versus phase characterization.

7. The VFL lens system of claim 6, wherein:
   the phase offset compensating portion comprises a phase offset estimation portion that is operable to perform an adjustment process that adjusts the estimated value of the phase offset to satisfy a criteria wherein when the Z-height determination process is based on the adjusted estimated value of the phase offset and is repeated corresponding to at least first and second respective subsets of raw phase timing signal values corresponding to movements of the modulated focus position of the imaging system in respective opposite directions when imaging a fixed surface region, that at least one of a variance or difference between the resulting opposite-direction Z-height measurements is approximately minimized.

8. The VFL lens system of claim 7, wherein the adjustment process comprises operations including:
   (a) adjusting the estimated value of the phase offset by an increment to provide a trial estimated value of the phase offset;
   (b) performing the Z-height determination process based on the trial estimated value of the phase offset and repeating the operations corresponding to at least first and second respective subsets of raw phase timing signal values corresponding to movements of the modulated focus position of the imaging system in respective opposite directions when imaging a fixed surface region;
   (c) determining at least one of a corresponding trial variance or difference between the resulting opposite-direction Z-height measurements; and
   (d) repeating the operations (a) through (c) a plurality of times to determine at least one of a trial variance or difference that is approximately minimized and using the corresponding trial estimated value of the phase offset as the estimated value of the phase offset for a subsequent Z-height measurement operation of the VFL lens system.

9. The VFL lens system of claim 8, wherein the phase offset estimation portion is configured to perform the adjustment process automatically, according to at least one of a timing determined by a user of the VFL lens system, or a timing automatically determined by the VFL lens system.

10. The VFL lens system of claim 8, wherein the phase offset estimation portion is configured to perform the adjustment process partially automatically, wherein a user of the VFL lens system operates an adjustment element in a user interface feature of the VFL lens system to perform at least one instance of the operation (a), in order to provide a trial estimated value of the phase offset.

11. The VFL lens system of claim 8, wherein the at least one corresponding trial variance or difference is determined according to a standard deviation calculation.

12. The VFL lens system of claim 7, wherein the adjustment process comprises:
   imaging a fixed surface region and determining a corresponding set of raw phase timing signal values comprising at least first and second respective subsets of raw phase timing signal values corresponding to movements of the modulated focus position of the imaging system in respective opposite directions, wherein the first and second respective subsets of raw phase timing signal values are nominally symmetrically spaced around the 90-degree phase or the 270-degree phase of the first periodic modulation phase; and
   adjusting the estimated value of the phase offset based on the first and second respective subsets of raw phase timing signal values.

13. The VFL lens system of claim 12, wherein the operation of adjusting the estimated value of the phase offset based on the first and second respective subsets of raw phase timing signal values comprises:
   approximating a first peak phase timing signal value of the 90-degree phase or 270-degree phase of the first periodic modulation phase as an average value of the first and second respective subsets of raw phase timing signal values;
   establishing a second peak phase timing signal value of the corresponding 90-degree phase or 270-degree phase of the second periodic modulation phase based on the phase timing signal being synchronized with the periodic signal in the controller that has the second periodic modulation phase; and adjusting the estimated value of the phase offset to a value corresponding to a difference between the first and second peak phase timing signal values.

14. The VFL lens system of claim 6, wherein:
the imaged surface region corresponds to a first imaged surface region that has a known Z-height difference from a second imaged surface region;
the determined Z-height measurement corresponds to a first Z-height measurement of the first imaged surface region; and
the phase offset compensating process further comprises:
utilizing the Z-height determination process to determine a second Z-height measurement of the second imaged surface region based at least in part on a second corresponding raw phase timing signal value and the estimated value of the phase offset;
determining a measured Z-height difference that corresponds to the difference between the first and second Z-height measurements; and
determining a scaling factor that, when applied to the measured Z-height difference, results in a value that is equal to the known Z-height difference.

15. The VFL lens system of claim 14, wherein the phase offset compensating process further comprises determining an adjusted Z-height versus phase characterization at least in part by applying the scaling factor to adjust the respective Z-heights of the first Z-height versus phase characterization.

16. The VFL lens system of claim 1, wherein:
the phase offset compensating portion is configured to determine an estimated value of the phase offset; and
the phase offset compensating process comprises a Z-height determination process for determining a Z-height measurement of an imaged surface region based on at least one corresponding raw phase timing signal value and the estimated value of the phase offset, the Z-height determination process comprising:
determining an adjusted Z-height versus phase characterization in which the respective phase timing signal values of the first Z-height versus phase characterization are shifted based on the estimated value of the phase offset; and
determining the Z-height measurement based on the at least one raw phase timing signal value and the adjusted Z-height versus phase characterization.

17. A variable focal length (VFL) lens system that provides a surface Z-height measurement of an imaged surface region, the VFL lens system comprising:
an imaging system including a VFL lens;
a controller configured to:
control the VFL lens to periodically modulate its optical power and thereby periodically modulate a focus position of the imaging system over a plurality of focus positions along a Z-height direction at a first operating frequency, wherein the periodically modulated VFL lens optical power defines a first periodic modulation phase;
provide a phase timing signal, wherein the phase timing signal is synchronized with a periodic signal in the controller that has the first operating frequency and that has a second periodic modulation phase that has a phase offset relative to the first periodic modulation phase; and provide a first Z-height versus phase characterization that relates respective Z-heights to respective phase timing signal values;
a focus determining portion comprising:
an optical detector that inputs light from the imaging system; and
a focus signal processing portion configured to determine raw phase timing signal values corresponding to when signal data from the optical detector indicates that an imaged surface region is at a focus position, the raw phase timing signal values including a phase offset contribution as related to the phase offset between the first and second periodic modulation phases; and
a phase offset compensating portion configured to input raw phase timing signal values corresponding to imaged surface regions and perform a phase offset compensating process that provides Z-height measurements of the imaged surface regions, wherein:
the phase offset compensating portion is configured to determine an estimated value of the phase offset; and
the phase offset compensating process comprises a Z-height determination process for determining a Z-height measurement of an imaged surface region based on at least one corresponding raw phase timing signal value and the estimated value of the phase offset.

18. The VFL lens system of claim 17, wherein the Z-height determination process comprises:
determining a compensated phase timing signal value by processing the at least one corresponding raw phase timing signal value with the estimated value of the phase offset to reduce the phase offset contribution; and
determining a Z-height measurement based on the compensated phase timing signal value and the first Z-height versus phase characterization.

19. A method to determine a surface Z-height measurement of a surface region, the method comprising:
controlling a variable focal length (VFL) lens to periodically modulate its optical power and thereby periodically modulate a focus position of an optical system over a plurality of focus positions along a Z-height direction at a first operating frequency, wherein the periodically modulated VFL lens optical power defines a first periodic modulation phase;
providing a phase timing signal, wherein the phase timing signal is synchronized with a periodic signal that has the first operating frequency and that has a second periodic modulation phase that has a phase offset relative to the first periodic modulation phase;
providing a first Z-height versus phase characterization that relates respective Z-heights to respective phase timing signal values;
determining raw phase timing signal values corresponding to when signal data from an optical detector indicates that a surface region is at a focus position, the raw phase timing signal values including a phase offset contribution as related to the phase offset between the first and second periodic modulation phases; and
performing a phase offset compensating process that provides Z-height measurements of surface regions, wherein at least one of Z-height errors or Z-height variations that are related to the phase offset contribution are at least partially eliminated in the provided Z-height measurements.

20. The method of claim 19, wherein:

the phase offset compensating process comprises a Z-height determination process for determining a Z-height measurement of a surface region based on at least one corresponding raw phase timing signal value and an estimated value of the phase offset, the Z-height determination process comprising:

determining a compensated phase timing signal value by processing the at least one corresponding raw phase timing signal value with the estimated value of the phase offset to reduce the phase offset contribution; and determining a Z-height measurement based on the compensated phase timing signal value and the first Z-height versus phase characterization.

* * * * *